US006968058B1

(12) United States Patent
Kondoh et al.

(10) Patent No.: US 6,968,058 B1
(45) Date of Patent: Nov. 22, 2005

(54) DIGITAL EVIDENTIAL CAMERA SYSTEM FOR GENERATING ALTERATION DETECTION DATA USING BUILT-IN ENCRYPTION KEY

(75) Inventors: Takashi Kondoh, Chofu (JP); Masaki Higurashi, Hino (JP); Yasuhiro Komiya, Hino (JP); Hidetoshi Yamada, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/293,142

(22) Filed: Apr. 16, 1999

(30) Foreign Application Priority Data

Apr. 20, 1998 (JP) .............................. 10-109352

(51) Int. Cl.[7] ........................................... H04N 7/167
(52) U.S. Cl. ..................... 380/200; 380/30; 380/201; 380/205; 380/207; 380/277; 713/176; 713/187; 713/189; 713/193; 713/194; 713/200; 705/57; 396/229; 358/909.1
(58) Field of Search ..................... 380/30, 207, 200; 713/176; 396/229; 358/909.1

(56) References Cited

U.S. PATENT DOCUMENTS

| 4,054,887 | A | * | 10/1977 | Holle et al. ..................... 354/24 |
| 4,422,745 | A | * | 12/1983 | Hopson ........................ 396/211 |
| 4,475,130 | A | * | 10/1984 | Miller et al. ................. 358/335 |
| 4,549,175 | A | * | 10/1985 | Rokunohe et al. ........... 340/794 |
| 4,849,783 | A | * | 7/1989 | Kiyohara et al. ............ 354/442 |
| 4,949,381 | A | * | 8/1990 | Pastor .......................... 380/51 |
| 5,117,458 | A | * | 5/1992 | Takaragi et al. ............. 380/228 |
| 5,157,725 | A | * | 10/1992 | Lindholm ....................... 380/9 |
| 5,185,798 | A | * | 2/1993 | Hamada et al. ................ 380/23 |
| 5,262,820 | A | * | 11/1993 | Tamai et al. .................. 396/54 |
| 5,329,623 | A | * | 7/1994 | Smith et al. ................. 395/275 |
| 5,343,527 | A | * | 8/1994 | Moore ........................... 380/4 |
| 5,452,049 | A | * | 9/1995 | Takagi ........................ 396/155 |
| 5,499,294 | A |   | 3/1996 | Friedman |
| 5,590,306 | A | * | 12/1996 | Watanabe et al. ............ 711/115 |
| 5,598,526 | A | * | 1/1997 | Daniel et al. ................ 395/507 |
| 5,706,049 | A | * | 1/1998 | Moghadam et al. ... 348/333.03 |
| 5,765,176 | A | * | 6/1998 | Bloomberg .................. 707/514 |

(Continued)

FOREIGN PATENT DOCUMENTS

EP         0306062 A2 *   3/1989    .......... G03B 19/00

(Continued)

OTHER PUBLICATIONS

Friedman, Gary The Trustworthy Digital Camera: Restoring Credibility to the Photographic Image, 1993, IEEE, pp. 905-910.*

(Continued)

*Primary Examiner*—Ayaz Sheikh
*Assistant Examiner*—Aravind K Moorthy
(74) *Attorney, Agent, or Firm*—Frishauf, Holtz, Goodman & Chick, P.C.

(57) ABSTRACT

A digital evidential camera system is for detecting the alteration of image data obtained by photographing an object. The system comprises the camera and an alteration detection unit. The camera includes an image pickup unit for picking up an image of the object and an encryption processing unit for generating the alteration detection data using an encryption key built therein from the image data obtained by the image pickup unit. The alteration detection unit decrypts the alteration detection data using a decryption key corresponding to the encryption key, and detects whether the image data is altered based on the result of decryption.

4 Claims, 15 Drawing Sheets

U.S. PATENT DOCUMENTS

| | | | | |
|---|---|---|---|---|
| 5,799,219 A | * | 8/1998 | Moghadam et al. | 396/319 |
| 5,801,856 A | * | 9/1998 | Moghadam et al. | 358/527 |
| 5,862,217 A | * | 1/1999 | Steinberg et al. | 380/10 |
| 5,862,218 A | * | 1/1999 | Steinberg | 380/10 |
| 5,898,779 A | * | 4/1999 | Squilla et al. | 380/23 |
| 6,385,407 B1 | * | 5/2002 | Inose | 399/24 |
| 6,456,799 B2 | * | 9/2002 | Enderby | 396/323 |
| 6,522,769 B1 | * | 2/2003 | Rhoads et al. | 382/100 |
| 6,592,032 B1 | * | 7/2003 | Takaragi et al. | 235/382 |
| 6,661,710 B2 | * | 12/2003 | Kwon | 365/185.24 |
| 6,859,546 B2 | * | 2/2005 | Matsukawa et al. | 382/103 |

FOREIGN PATENT DOCUMENTS

| | | | | |
|---|---|---|---|---|
| EP | 0552543 A1 | * | 7/1993 | G03B 17/18 |
| JP | 09-200730 | | 7/1997 | |

OTHER PUBLICATIONS

Fridrich, Jiri, Image Watermarking for Tamper Detection, 1998, IEEE, pp. 404-408.*

Wu et al, Watermarking for Image Authentication, 1998, IEEE, pp. 437-441.*

* cited by examiner

DIGITAL EVIDENTIAL CAMERA SYSTEM FOR GENERATING ALTERATION DETECTION DATA USING BUILT-IN ENCRYPTION KEY

BACKGROUND OF THE INVENTION

The present invention relates to a digital evidential camera system, a decryption key acquisition/registration system and a digital image editing system.

The photographs and voices recorded in camera films or other media in analog fashion has been conventionally used as admissible evidences in courts and the like. With the recent progress of digital technologies, however, the use of apparatuses for recording images and voices as digital data has extended. These digitized apparatuses have advantages that they are not degenerated even when copied, they can be distributed rapidly using communication lines, and the information contained therein can be readily processed and edited. The ease with which the information can be processed or edited also means the ease with which the information can be altered. This gives rise to the doubt as to the admissibility of such information. For digital images and voices to be used as admissible information, therefore, some method having the function of preventing the alteration of digital data is required. A camera having such a protective function is called a digital evidential camera.

In order to realize this digital evidential camera, an application of the digital signature technique generally used in communications or the like has been conceived. The digital signature system uses a pair of keys. One is called a private key for encryption, and the other a public key for decryption. Digital data are encrypted using the private key, and decrypted using the public key. The pair of a public key and a private key have a characteristic of being very difficult to mathematically obtain a private key or a public key from a public key or a private key respectively. The private key is required to be strictly managed in such a manner as never to be used by other than the owner, while the public key is made public for general use.

In a method of detecting an alteration, a first step is to extract a code of predetermined size called message digest (hereinafter called MD) at the transmitting end, using the digest algorithm based on a hash function from the digital data involved. A method of extracting the MD from the digital data involved is made public, and any person having the original data can extract the MD. The MD has such a characteristic based on the well-known characteristic of the hash function as to undergo a considerable change with a small change in the original digital data.

The MD thus extracted is encrypted using the private key. With this as a message authentication code (hereinafter called the MAC), the encrypted MD is transmitted to the other party together with the original data. It is assumed that the public key paired with the private key has been delivered without fail to the receiving party (the receiving party is required to have acquired the key without fail, and may be delivered to a third party).

Recently, an alteration prevention code using the public key encryption algorithm is called the Digital Signature and an alteration prevention code using the common key encryption algorithm is called the Message Authentication Code (MAC). However, in this specification, a MAC is defined broadly as those of including an alteration prevention code using the common key encryption algorithm and an alteration prevention code using the private key/public key encryption algorithm.

At the receiving end, in order to check that the original data is not altered, first determines the MD' using the message digest algorithm from the original data. Then, using the public key, he decrypts the MAC to determine the MD, and checks whether this MD coincides with the MD' or not. Even if the original data is altered by a third party, the third party who owns no private key cannot produce the MAC that can be decrypted with the public key. Therefore, the MD and the MD' assume different values. As a result, it can be found that the original data has been altered by a third party.

As described above, the digital signature technique can be used for detecting the alteration of digital data. In the case where the method of detection of an alteration described above is used for a digital evidential camera, the private key as an encryption key must never leak outside. In the prior art, however, it is not an easy matter to manage the private key at a high security level, and therefore the admissibility of the digital image cannot be improved.

Image data, for their characteristics, are often required to be compressed, cut out in areas, have a caption inserted therein or otherwise processed. According to a conventional method of digital signature used for document data, a slight change in data contents is regarded as an alteration of the data. With the conventional digital signature system, therefore, the required editing work can never be accomplished due to the above-mentioned characteristics of the image data.

Accordingly, the object of the present invention is to provide a digital evidential camera system and a decryption key acquisition/registration system which can be managed at a very high security level, and a digital image editing system which can maintain the admissibility of a digital image even after it is compressed, cut out in areas, has a caption inserted therein or otherwise edited as required for its characteristics.

BRIEF SUMMARY OF THE INVENTION

In order to achieve the object described above, according to a first aspect of the present invention, there is provided a digital evidential camera system for detecting the alteration of image data obtained by photographing an object, comprising a camera including an image pickup unit for picking up an image of an object and an encryption processing unit for generating an alteration detection data using a built-in encryption key from the image data obtained by picking up the object, and an alteration detection unit for decrypting the alteration detection data generated by the encryption processing unit using a decryption key corresponding to the encryption key and detecting whether the image data is altered or not based on the result of the decryption.

According to a second aspect of the present invention, there is provided a digital evidential camera system for detecting the alteration of image data obtained by photographing an object, comprising a camera including an image pickup unit for picking up an image of an object and an encryption processing unit for generating an alteration detection data using a built-in encryption key from the image data obtained by picking up the image of the object, and an alteration detection unit for decrypting the alteration detection data generated by the encryption processing unit using a decryption key corresponding to the encryption key and detecting whether the image data is altered or not based on the result of the decryption, wherein the camera includes a mode selection unit which, in addition to the alteration monitor mode for detecting whether the image data is altered or not, has a secure mode for encrypting the image data transferred from the camera to the alteration detection unit, a digital watermark mode for embedding the digital watermark data in the image data and a normal mode for taking a photograph without the security function, the mode selection unit selecting at least a desired one of the modes.

According to a third aspect of the present invention, there is provided a decryption key acquisition/registration system comprising a decryption key server including a decryption key storage unit for storing a unique identifier to the system and a first decryption key corresponding to a first encryption key generated as a key corresponding to the identifier, and a decryption key output unit for generating the alteration detection data for the first decryption key using a second encryption key and outputting the alteration detection data together with the first decryption key, and a decryption key acquisition unit including a decryption key storage unit for storing the first decryption key acquired through communication means or the like from the decryption key server, and an alteration detection unit for decrypting the alteration detection data supplied from the decryption key server through communication means or the like using the second decryption key corresponding to the second encryption key and detecting whether the first decryption key is altered or not based on the result of decryption.

According to a fourth aspect of the present invention, there is provided a digital image editing system for detecting the alteration of image data and editing the image data, comprising a filing management unit for filing and managing the image data input thereto through the image input unit, an alteration detection unit for decrypting a first alteration detection data attached to the image data by use of a decryption key corresponding to a first encryption key used for generating the alteration detection data, and detecting the alteration of the image data by comparing the decrypted first alteration detection data with the image data, an image editing unit for processing the image data using various functions, and an image file updating unit for generating, using a second encryption key other the first encryption key, second alteration detection data from the edited image data processed by the image editing unit and the editing history data from the image editing unit, and adding the second alteration detection data to the edited image data.

DETAILED DESCRIPTION OF THE INVENTION

Figure 1:
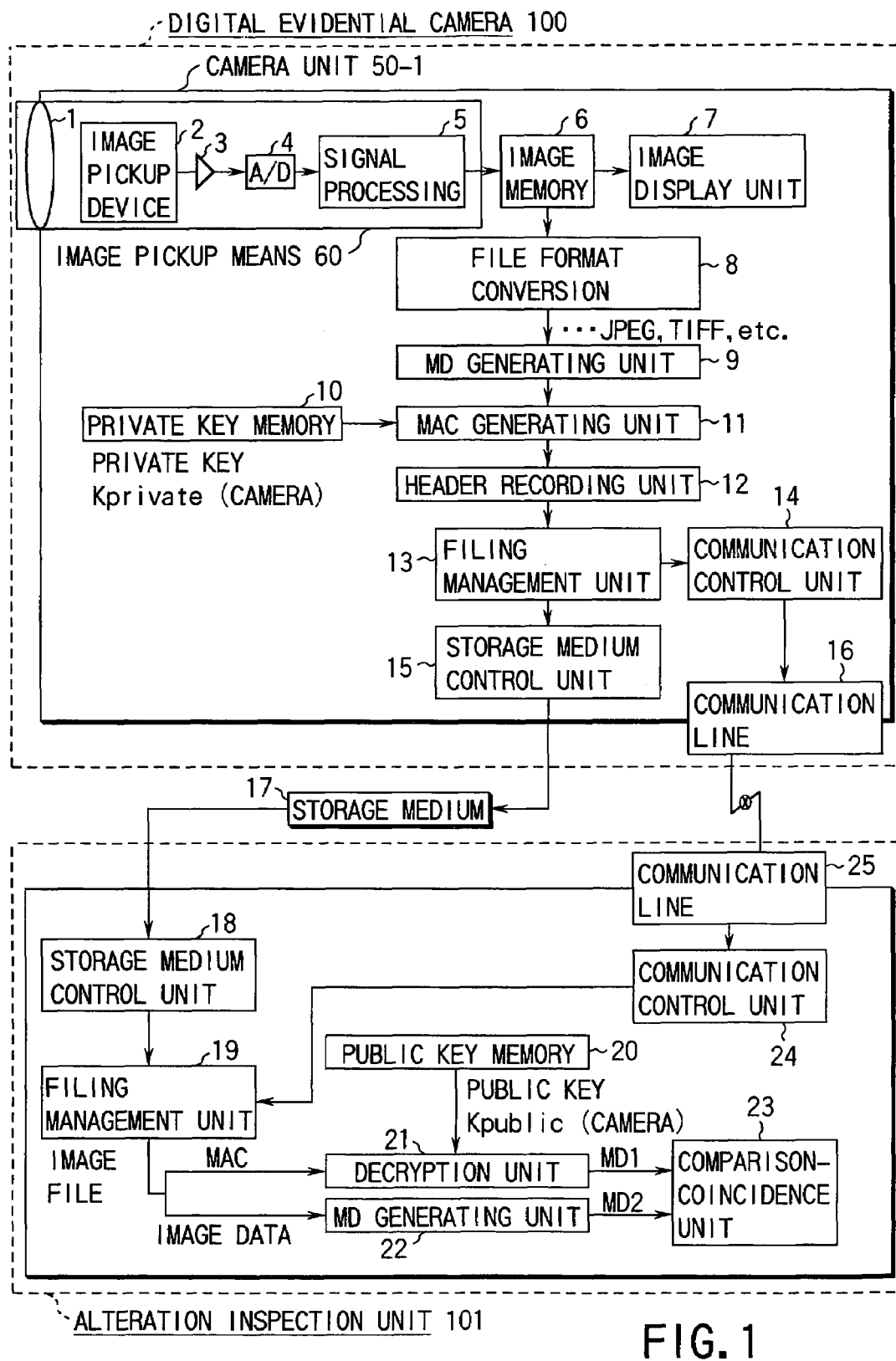
FIG. 1 is a diagram showing a configuration of a digital evidential camera system according to a first embodiment of the present invention.

Embodiments of the present invention will be explained in detail below with reference to the drawings. FIG. 1 is a diagram showing a configuration of a digital evidential camera system according to a first embodiment of the present invention. This system comprises a digital evidential camera 100 and an alteration inspection unit 101. A camera unit 50-1 of the digital evidential camera 100 includes image pickup means 60 having a photographing lens 1, an image pickup device 2, an amplifier 3, an A/D converter 4 and a signal processing unit 5. The image of an object entering the system through the photographing lens 1 is picked up by the image pickup device 2. The electrical signal produced by this image pickup operation is amplified in the amplifier 3, converted into a digital signal in the A/D converter 4, and processed as predetermined in the signal processing unit 5. The resulting signal is stored as image data in an image memory 6. The image data stored in the image memory 6 is displayed as required on an image display unit 7.

Figure 2:
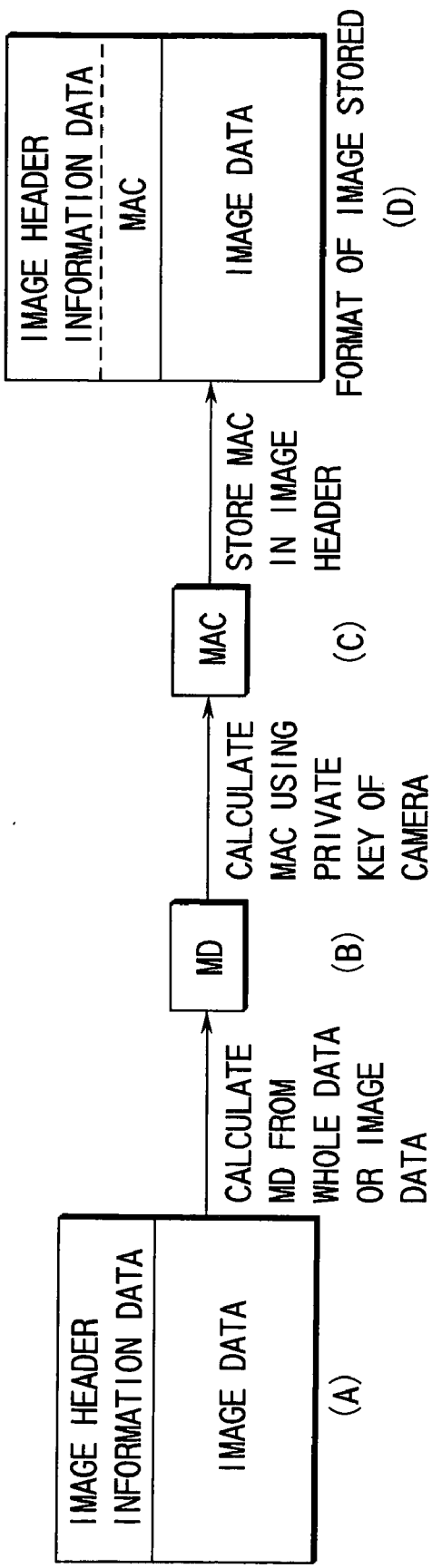
FIG. 2 is a diagram showing the steps of the adding the MAC to the image data.

The image data stored in the image memory 6 is converted into a standard image format such as JPEG or TIFF in a file format conversion unit 8. As a result, a file format including the image data with file header information added thereto is generated ((A) in FIG. 2). Then, a MD generating unit 9 generates a MD for the image data or the whole data including the file header by use of a predetermined message digest algorithm ((B) of FIG. 2). Then, a MAC generating unit 11 generates a MAC by encrypting the MD using a private key $K_{private}$ (camera) stored in advance in a private key memory 10 ((C) of FIG. 2). A file header recording unit(header recording unit)12, on the other hand, stores the generated MAC in the image file header ((D) of FIG. 2). The image file of the file format generated in this way is managed by a filing management unit 13.

An alteration detection unit 101 is used for detecting whether this image file is altered or not during the transportation thereof in a recording medium 17 removable under the control of a storage medium control unit 15 or during the transmission thereof through a communication line 16 under the control of a communication control unit 14.

Specifically, the image file stored in the storage medium 17 mounted on the alteration inspection unit 101 is read out by the filing management unit 19 under the control of the storage medium control unit 18. As an alternative, the image file is sent to the filing management unit 19 through the communication line 25 under the control of the communication control unit 24. The filing management unit 19 separates the image file into the MAC and the image data (which may include the file header information such as JPEG and TIFF in addition to the image data). The MAC is input to the decryption unit 21, and the image data is input to the MD generating unit 22.

In the decryption unit 21, the MD1 is generated by decrypting the MAC using the public key $K_{public}$ (camera) stored in advance in the public key memory 20. This public key $K_{public}$ (camera) and the private key $K_{private}$ (camera) make up a pair for the encryption/decryption process. In the MD generating unit 22, on the other hand, the MD2 is generated using a predetermined message digest algorithm from the input image data. Then, a comparison-coincidence unit 23 compares MD1 and MD2 and when they fail to coincide with each other, can determine that the image file has been altered by a third party.

According to the first embodiment described above, the alteration detection data (MAC) is generated from the image data using the encryption key in the camera, and the alteration detection data is written in the image file, for example, in the file header of the image file. In this way, it is possible to check whether the image data is altered or not. Thus, it is possible to improve the admissibility of the digital image which has hitherto been considered inferior to that of the image photographed by a camera using a film.

Also, the encryption key for generating the alteration detection data must never leak to third parties including the camera user. According to this embodiment, the encryption key for generating the alteration detection data is stored in a memory area in the camera beforehand. Therefore, the encryption key can be managed at a very high security level in hardware.

Now, an explanation will be given of a digital evidential camera having various modes (multi modes) as a second embodiment of the present invention. By providing the camera with means for selecting the various modes as described below, the desired function can be set in accordance with the object with which to use the camera. The various modes include a normal photographing mode without the security function, an alteration monitor mode for adding the alteration detection data to the photographed image file, a digital watermark mode for recording the copyright information of the photograph as a watermark in an image file, and a secure mode for encrypting the image file in the case where the image file is stored in a removable storage medium or in the case where the image file is transmitted using the communication function.

Figure 3:
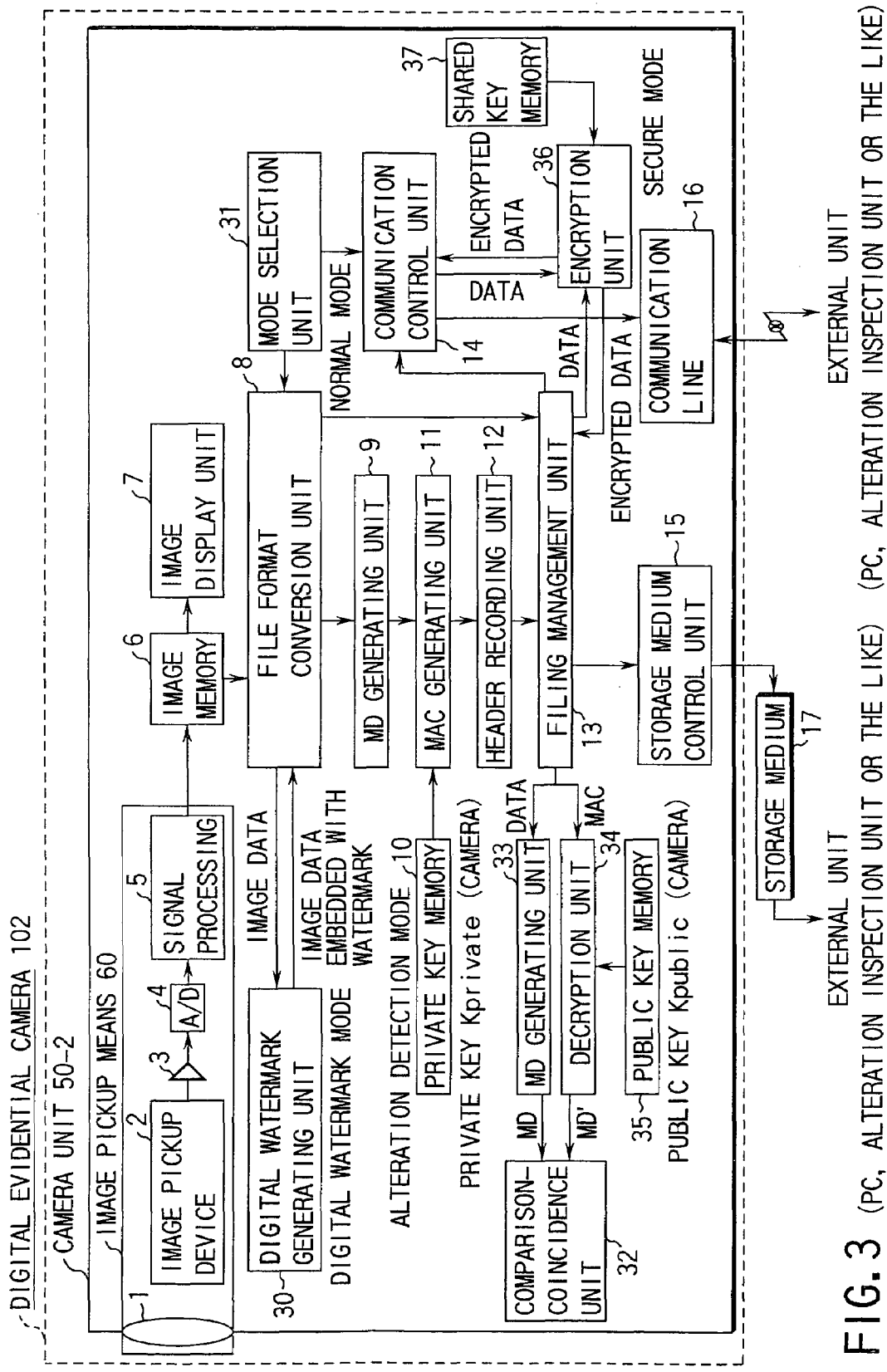
FIG. 3 is a diagram showing a configuration of a digital evidential camera according to a second embodiment of the present invention.

Now, a more detailed description will be given with reference to FIG. 3. In FIG. 3, the component parts having the same reference numerals, respectively, as those in FIG. 1 are assumed to have the same functions, respectively. With a digital evidential camera 102 including a camera unit 50-2 in this embodiment, the user can select the desired mode from various modes described above through a mode selection unit 31. Assuming that the normal mode is selected, for example, the image data picked up from an object by the image pickup means 60 is stored in the image memory 6. In this mode, the security mode does not work, but the image data read from the image memory 6 is converted in format by, the file format conversion unit 8, and sent to and managed by the filing management unit 13.

In the case where the digital watermark mode is selected, on the other hand, the image data is input from the file format conversion unit 8 to the digital watermark generation unit 30. After the digital watermark is embedded in the image data, the image data is returned to the file format conversion unit 8 and converted in format again. The resulting image data is managed in the filing management unit 13.

Also, in the case where the alteration prevention mode is selected, after the MAC is added to the header in a manner described above referring to FIG. 2, the resulting image data is managed in the filing management unit 13.

Also, in the case where the alteration detection mode is selected, whether the image file acquired from the storage medium 17 or an external unit (PC, alteration inspection unit or the like) through a communication line 16 and sent to the filing management section 13 has been altered or not is detected. Specifically, the image data to which the MAC is added is separated into the MAC and the image data. The image data is input from the filing management unit to the MD generating unit 33. The MAC is input to the decryption unit 34. The MD generating unit 33 generates the MD from the input image data using a predetermined message digest algorithm. The decryption unit 34, on the other hand, generates the MD' using the public key $K_{public}$ stored in the public key memory 35. The comparison-coincidence unit 32 compares MD with MD' and determines whether MD and MD' coincide with each other. In the case where the two fail to coincide, the image data is found to have been altered by a third party.

Also, the secured mode is used for storing the image data in a storage medium. In such a case, the image data is read from the filing management unit 13 and input to the encryption unit 36. The encryption unit 36 encrypts the image data using the shared key stored in a shared key memory 37. The image data thus encrypted is sent again to the filing management unit 13. After that, the image data thus encrypted is written in a removable storage medium 17 under the control of the recording medium control unit 15.

The secure mode is used also for transmitting the image file through a communication line. In such a case, the image data is read from the filing management unit 13 and input into the encryption unit 36. The encryption unit 36 encrypts the image data using a shared key stored in the shared key memory 37. The encrypted image data is transmitted to an external unit (PC, alteration inspection unit or the like) through a communication line 16 under the control of the communication control unit 14.

According to the second embodiment described above, a snap image is photographed in normal mode, an evidential image is photographed in alteration monitor mode, and an image of which a copyright is to be protected is photographed in digital watermark mode thereby to protect the copyright. Further, in the case where a highly confidential image is picked up and it is desired to send the image file safely, on the other hand, the secure mode is selected. Thus, the data can be stored and transmitted safely. Also, by combining a plurality of modes, a single camera can be used for various applications due to the effects described above.

Figure 4:
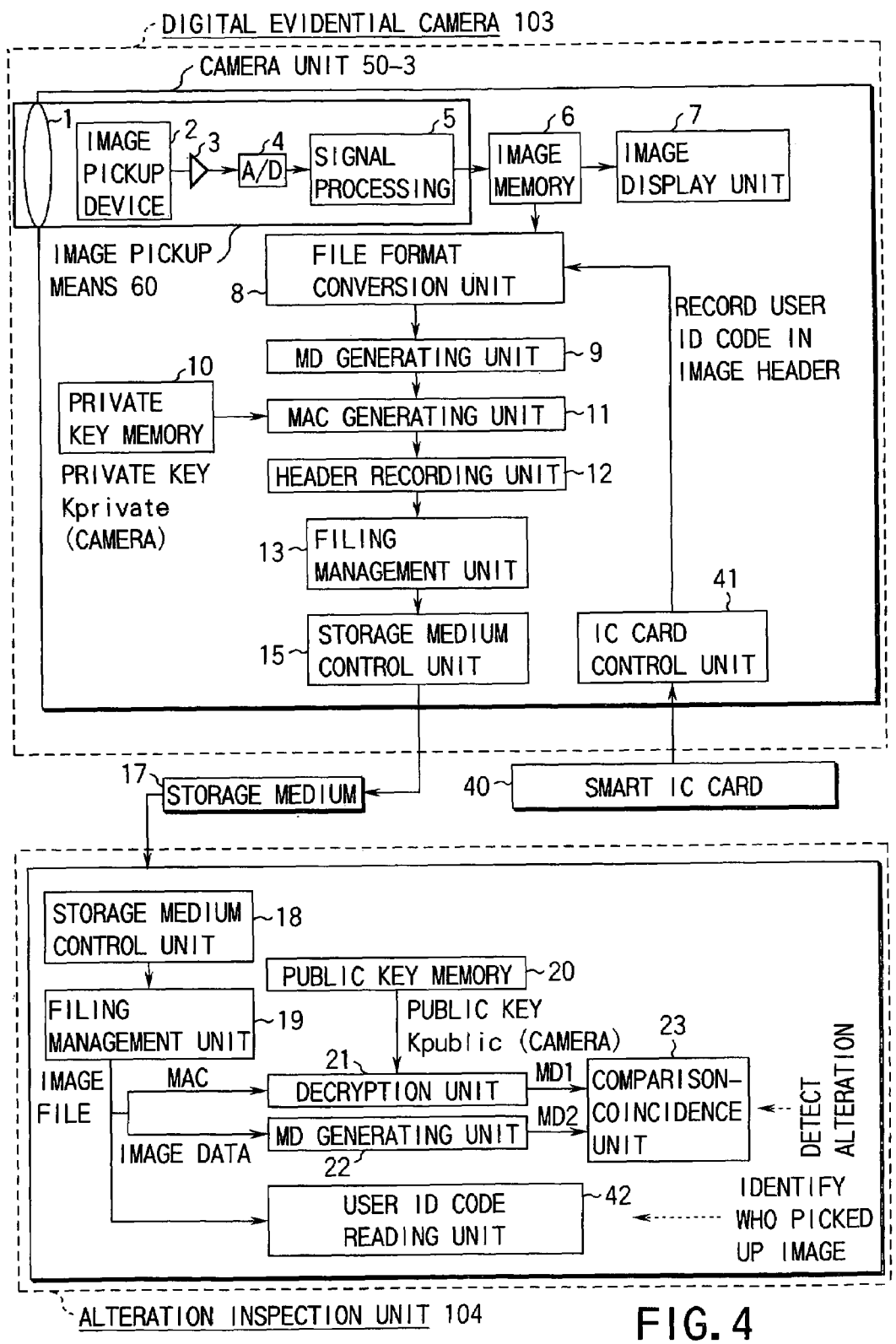
FIG. 4 is a diagram showing a configuration of a digital evidential camera system according to a third embodiment of the present invention.

A third embodiment of the present invention will be explained below with reference to FIG. 4. In FIG. 4, the same reference numerals as those in FIG. 1 designate the component parts having the same functions, respectively. Although the communication function in FIG. 1 and the configuration of the various modes in FIG. 3 are not shown, these functions can of course be included. In the digital evidential camera 103 having the camera unit 50-3, the image data obtained by picking up an image of an object by the image pickup means 60 is stored in the image memory 6. The image data is read from the image memory 6 and converted into a standard image format such as JPEG, TIFF by a file format conversion unit 8. As a result, a file format with the file header information added to the image data is generated ((A) of FIG. 5).

At the same time, a user identification (ID) code such as account name, identification number, and so on is read out from a smart IC card for user authentication 40 mounted on the camera unit 50-3 under the control of the smart IC card control unit(hereinafter called IC card control unit) 41 and input into the file format conversion unit 8. The user ID code is thus stored in the file header as shown in (B) of FIG. 5.

Figure 5:
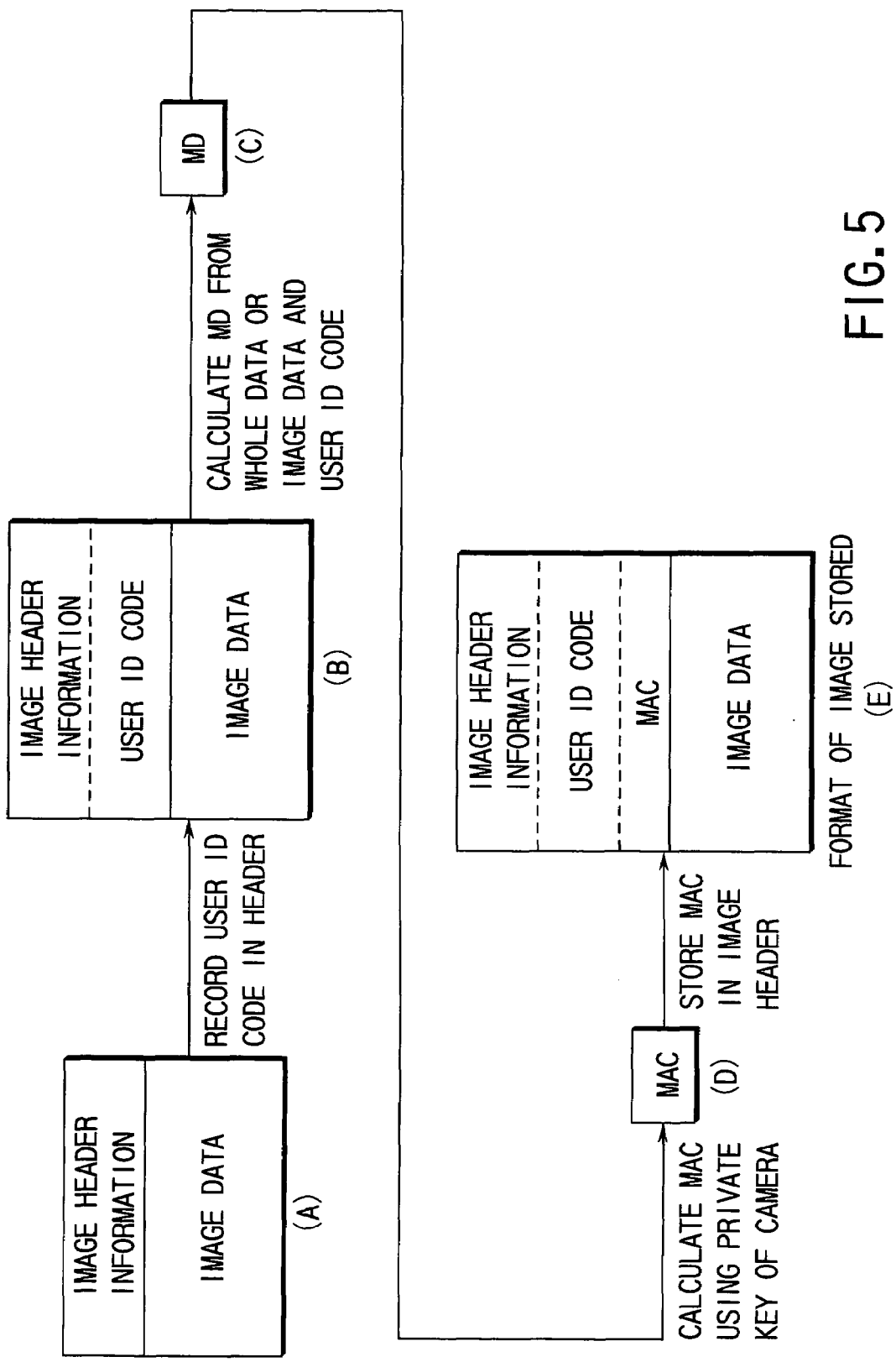
FIG. 5 is a diagram showing the steps of the adding the user authentication data and the MAC to the image data.

Then, the MD is generated in the MD generating unit 9 by applying a predetermined message digest algorithm to the whole data or the image data and user ID code ((C) of FIG. 5). Then, the MAC generating unit 11 generates the MAC by encrypting the MD using a private key $K_{private}$ (camera) stored beforehand in the private key memory 10 ((D) of FIG. 5). The file header recording unit 12 stores the MAC in the image file header in addition to the file header information and the user ID code. As a result, the image file is stored and managed as a file in the filing management unit 13 in an image format as shown in (E) of FIG. 5.

An alternation detection unit 104 is used to detect whether the image file has been altered while being carried in the form stored in the removable storage medium 17 under the control of the storage medium control unit 15.

Specifically, the image file stored in the storage medium 17 mounted on the alteration inspection unit 104 is read out by the filing management unit 19 under the control of the storage medium control unit 18. In the filing management unit 19, the image data are separated into the MAC and the data required for determining the MAC, that is, the whole data except for the MAC, or into the image data (which may include the file header information such as JPEG or TIFF in addition to the image data itself) and the user ID code. The MAC is input to the decryption unit 21, and the data required for determining the MAC is input to the MD generating unit 22. Further, the user ID code is input also to a user ID code reading unit 22.

The decryption unit 21 decrypts the MAC using the public key $K_{public}$ (camera) stored in advance in the public key memory 20 thereby to generate MD1. The MD generating unit 22, on the other hand, generates MD2 using a predetermined message digest algorithm from the input image data. Then, the comparison-coincidence unit 23 compares MD1 and MD2 with each other and, in the case where the two fail to coincide with each other, can determine that the data is altered.

Also, the user ID code reading unit 42 identifies the photographer by reading the user ID code. The identification of the photographer is meaningful only in the case where it has been determined that the image data is not altered.

According to the third embodiment described above, the user ID code is also added at the time of generating the alteration detection data for the image data. In this way, the photographer can be identified as well as whether the image data has been altered or not can be detected. Especially in this case, the alteration detection data is generated using the encryption key from the combination of the image data and the user ID code as information for authenticating the photographer. Therefore, the alteration of the image data and the alteration of the data for the user ID code can be detected with a single alteration detection data. If the combination of the image data and the user ID code is not altered, the photographer can be identified from the user ID code.

Figure 6:
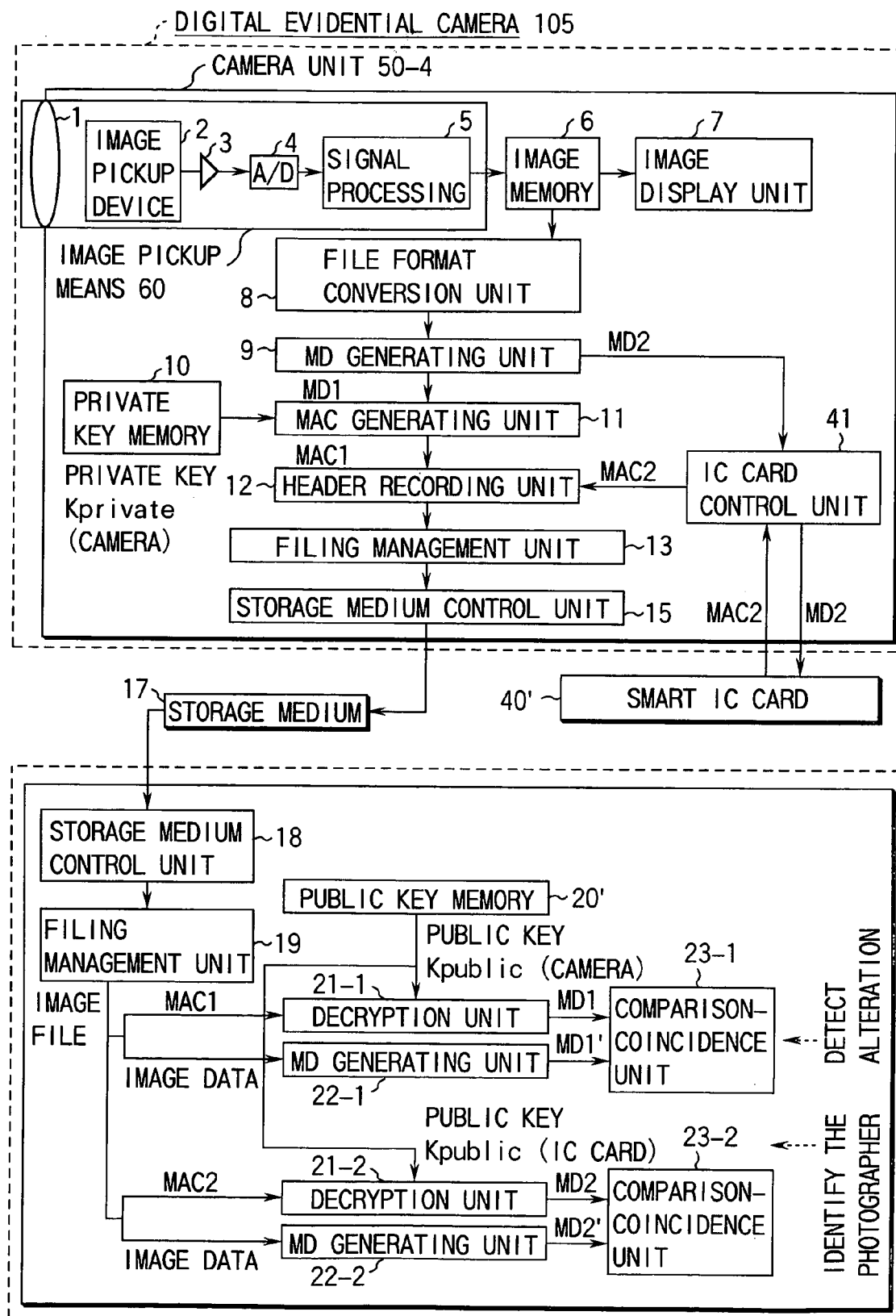
FIG. 6 is a diagram showing a configuration of a digital evidential camera system according to a fourth embodiment of the present invention.
Figure 7:
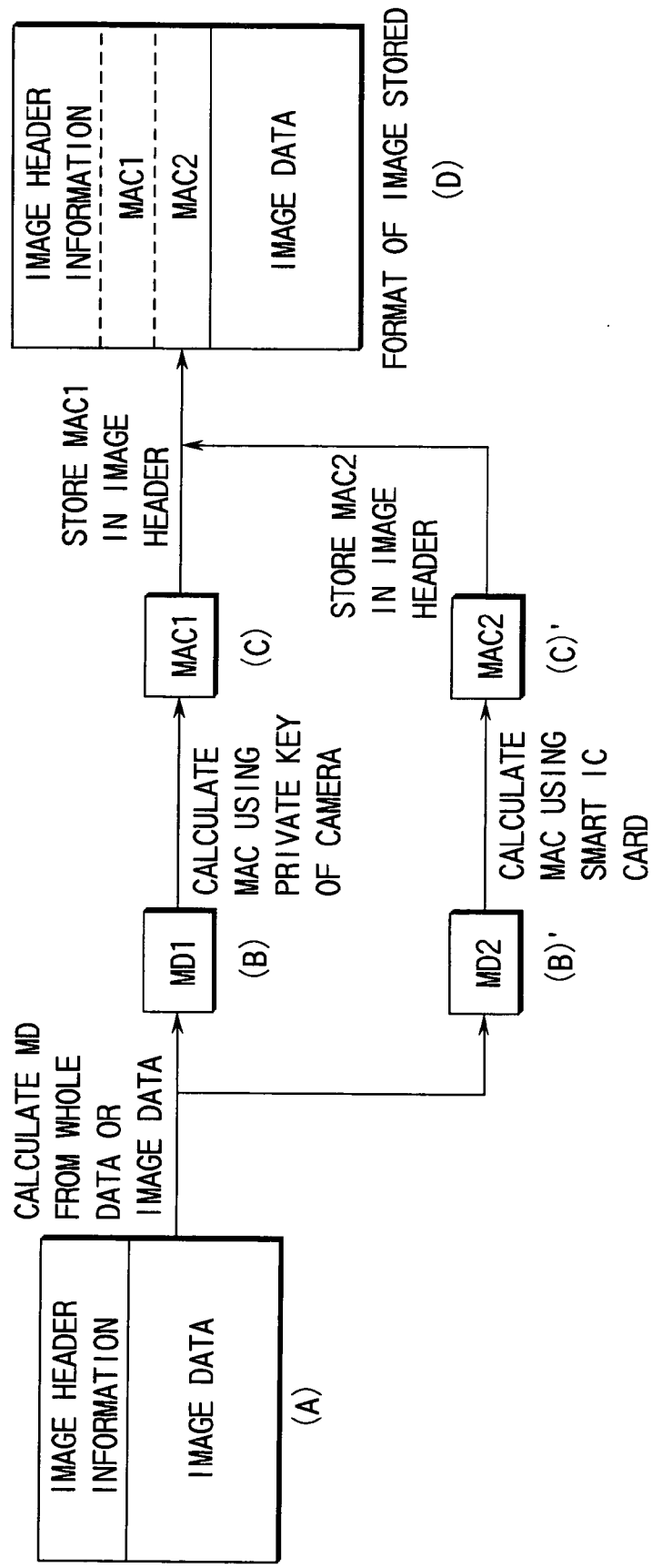
FIG. 7 is a diagram showing the steps of adding the MAC1 and MAC2 to the image data.

A fourth embodiment of the present invention will be explained below. In FIG. 6, the same reference numerals as those in FIG. 1 designate the component parts having the same functions as the corresponding component parts in FIG. 1, respectively. Also, in this case, the communication function of FIG. 1 and the various modes in FIG. 3 are not shown and can of course be included. In the digital evidential camera system 105 including the camera unit 50-4, the image data obtained by picking up the image of an object by the image pickup means 60 is stored in the image memory 6. The image data is read out of the image memory 6 by the file format conversion unit 8, and converted into such a standard image format as JPEG or TIFF. As a result, a file format is generated with the file header information data added to the image data ((A) of FIG. 7). Then, the MD generating unit 9 generates MD1 or MD2 ((B), (B)' of FIG. 7) using a predetermined message digest algorithm from the whole data or the image data. The MD1 and MD2 may be the same one. MD1 is input to the MAC generating unit 11. The MAC generating unit 11 generates MAC1 by calculating the MAC using the private key $K_{private}$ (camera) stored beforehand in the private key memory 10 ((C) of FIG. 7). This MAC1 is sent to the file header recording unit 12.

MD2, on the other hand, is input to the smart IC card for identifying a photographer 40' mounted on the camera unit 50-4 through the IC card control unit 41. The smart IC card for identifying the photographer 40' generates MAC2 by encrypting MD2 using the private key $K_{private}$ (IC card) stored in the internal private key memory ((C)' of FIG. 7). This MAC2 is sent to the file header recording unit 12 through the IC card control unit 41.

The file header recording unit 12 stores MAC1 and MAC2 in addition to the image header information data in the image file header. Consequently, the image file is stored and managed in the filing management unit 13 in an image format as shown in (D) of FIG. 7.

An alteration detection unit 106 is used for detecting whether this image file is altered or not while being carried in the form stored in the removable storage medium 17 under the control of the storage medium control unit 15.

Specifically, the image file stored in the storage medium 17 mounted on the alteration inspection unit 106 is read out by the filing management unit 19 under the control of the storage medium control unit 18.

The filing management unit 19 separates the image file into MAC1, MAC2 and the image data (which may include such file header information as JPEG or TIFF in addition to the image data itself). MAC1 is input to the decryption unit 21-1 and the image data is input to the MD generating unit 22-1. The decryption unit 21-1 generates MD1 by decrypting the MAC1 using the public key $K_{public}$ (camera) stored beforehand in the pubic key memory 20'. The public key $K_{public}$ (camera) and the private key $K_{private}$ (camera) make up a pair in the encryption/decryption process. On the other hand, the MD generating unit 22-1 generates MD1' using a predetermined message digest algorithm from the input image data. Then, the comparison-coincidence unit 23-1 compares MD1 and MD1' with each other and, if the two fail to coincide with each other, can determine that the image data is altered by a third party.

In similar fashion, MAC2 is input to the decryption unit 21-2, and the image data is input to the MD generating unit 22-2. The decryption unit 21-2 generates MD2 by decrypting MAC2 using the public key $K_{public}$ (IC card) stored beforehand in the public key memory 20'. The public key $K_{public}$ (IC card) and the private key $K_{private}$ (IC card) make up a pair in the encryption/decryption process.

In the MD generating unit 22-2, on the other hand, MD2' is generated using a predetermined message digest algorithm from the input image data. Then, the comparison-coincidence unit 23-2 compares MD2 and MD2' with each other, and in the case where the two coincide with each other, can identify the photographer.

According to the fourth embodiment described above, the photographer can be identified as well as the presence or absence of an image alteration can be detected by adding the information for identifying the photographer at the time of generating the alteration detection data for the image data. Especially in this case, the second alteration detection data is used, which is generated in a device external to the camera as information for identifying a photographer. Therefore, the digital signature used in other information systems such as the electronic mail or electronic commercial transactions can be used as the second alteration detection data. As a result, it is possible to construct a digital evidential camera system which can cooperate with the information systems constituting the social infrastructure such as electronic notaries and electronic commercial transactions.

A fifth embodiment of the present invention will be explained below. The fifth embodiment relates to a digital image editing system using an image server made up of such hardware as a board or a PCMCIA card. For simplicity's sake, a minimum required configuration of an image server is assumed.

In the conventional method using the alteration detection data for document data, even a slight change of an original data is regarded as an alteration. The image data, for its characteristics, is required to be often compressed or cut out or have a caption inserted therein or otherwise changed. In the case of a photo using a film, for example, it is equivalent to printing only the required portion on the photographic paper or to describing a comment on the back of the photo. When justified, these processes are not regarded as an alteration. In a method of determining whether a given process is justifiable or not, the process history is recorded describing particular processes performed for the original image data.

According to this embodiment, an image server is used to detect whether an image compressed, cut out partially or having a caption added thereto is altered by other than the particular image server, while at the same time detecting the history of the processes it has been subjected to.

Figure 8:
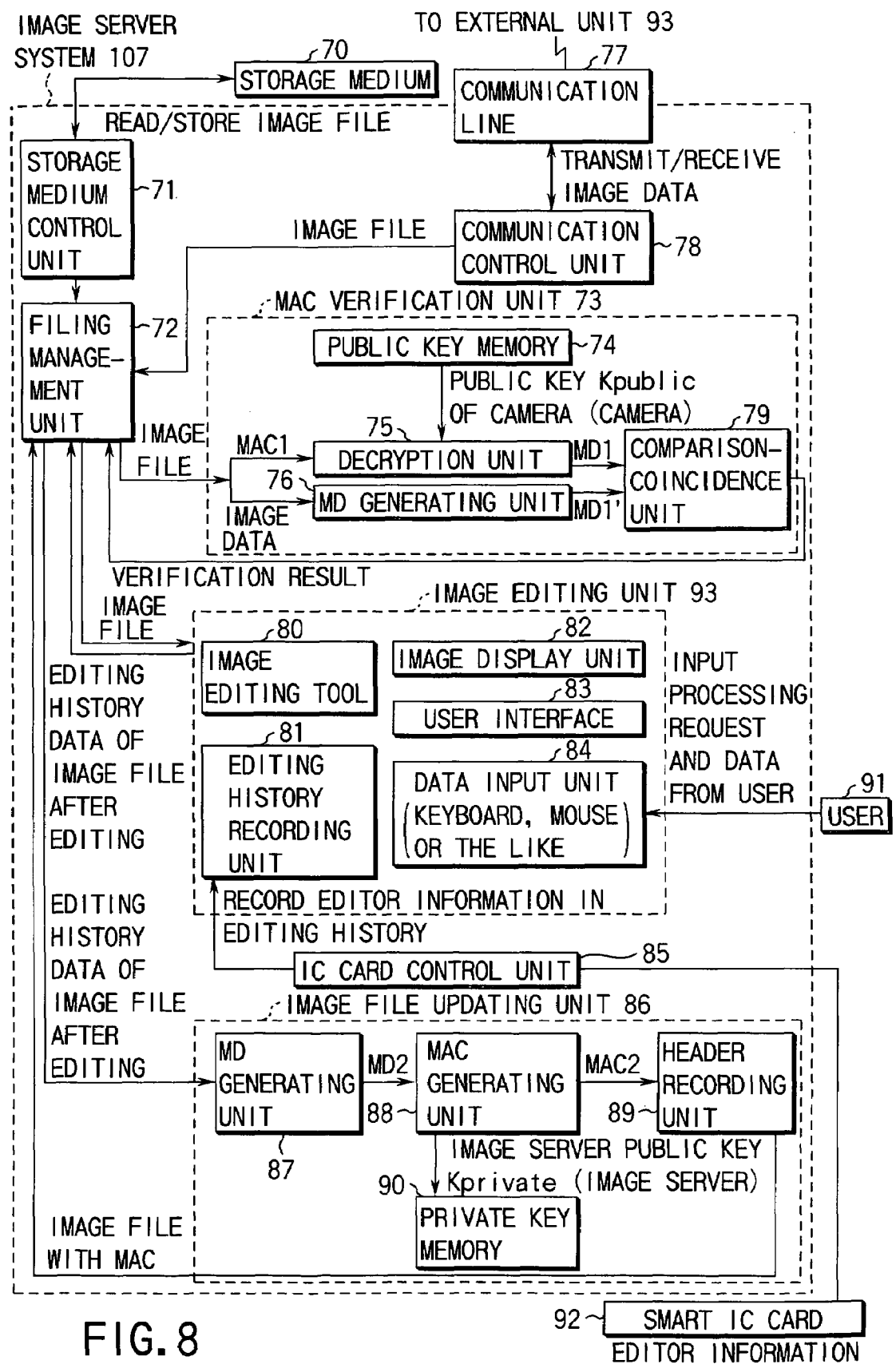
FIG. 8 is a diagram showing a configuration of an image server system according to a fifth embodiment of the present invention.
Figure 11:
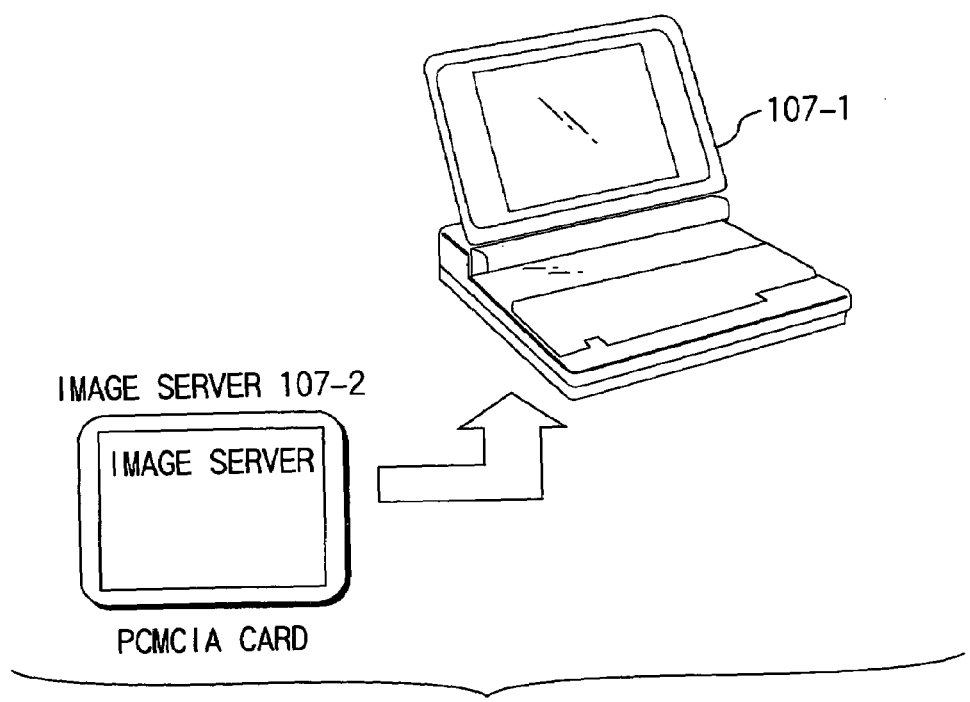
FIG. 11 is a diagram showing an example of the configuration of the image server system according to the fifth embodiment.

FIG. 8 is a diagram showing a configuration of an image server system 107 according to a fifth embodiment. As shown in FIG. 11, for example, the image server system 107 includes a personal computer 107-1 and an image server 107-2 made up of a PCMCIA card mountable on this personal computer 107-1.

The operation of the fifth embodiment will be explained below with reference to the flowchart of FIG. 9.

Figure 9:
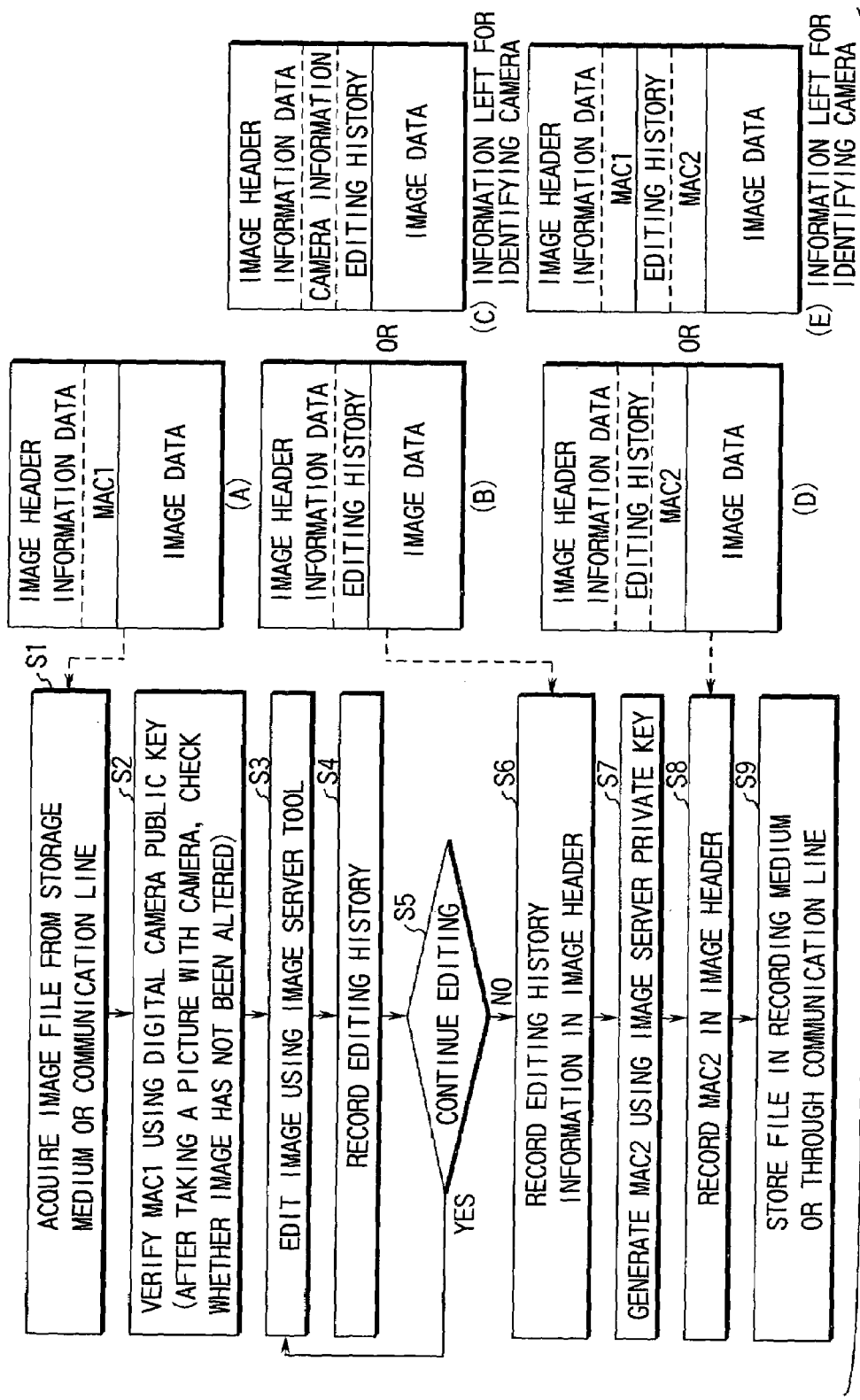
FIG. 9 is a flowchart for explaining the operation of the fifth embodiment.

First, a filing management unit 72 acquires an image file of the format as shown in (A) of FIG. 9 from a storage medium 70 under the control of a storage medium control unit 71. As an alternative, the filing management unit 72 acquires an image file from an external unit 93 under the control of a communication control unit 78 through a communication line 77 (step S1). In this case, provision of a serial cable, SCSI, IrDa or the like connection terminal directly connectable to the filing management unit 72 facilitates the input of the image file from the external unit. A similar effect is obtained by the provision of a terminal for connecting a network like Ethernet. Then, a MAC verification unit 73 receives the image file from the filing management unit 72 and verifies the MAC1 (step S2). Specifically, the filing management unit 72 separates the image file into MAC1 and the image data. MAC1 is input to a decryption unit 75, and the image data is input to a MD generating unit 76. The decryption unit 75 generates MD1 by decrypting the image data using a public key $K_{public}$ (camera) stored in the public key memory 74. The MD generating unit 76, on the other hand, generates MD1' using a predetermined message digest algorithm. A comparison-coincidence unit 79 compares MD1 and MD1' with each other and sends the result of verification as to whether the image photographed by the camera is subsequently altered to the filing management unit 72.

In the case where the image is not altered, the image file is input from the filing management unit 72 to an image editing unit 93 and edited by the user using an image editing tool 80 (step S3). In the process, the contents of the image file are displayed on an image display unit 82. The user 91, while viewing this screen, issues various processing requests or inputs data using a data input unit (keyboard, mouse or the like). Numeral 83 designates a user interface between the user 91 and the image server 107. The history at the time of editing is recorded in an editing history recording unit 81. At the same time, the editing history recording unit 81 reads and records the information for editor authentication from the smart IC card for editor authentication 92 as part of the editing history under the control of the IC card control unit 85. This editing work is continued until an instruction for stopping the editing is issued from the user and the determination in step S5 becomes NO.

The image file after editing and the editing history data are sent to the filing management unit 72. The filing management unit 72 records the editing history information in the image file header in a format as shown in (B) of FIG. 9 (step S6). In the case where the information for identifying the camera that has been used for taking a picture is left intact, the camera information is also recorded in the image header in a format as shown in (C) of FIG. 9.

Then, the image file after editing and the editing history data are input from the filing management unit 72 to the MD generating unit 87 of the image file updating unit 86, so that MD2 is generated using a predetermined message digest algorithm. Next, the MAC generating unit 88 generates MAC2 by encrypting the MD2 using the private key $K_{private}$ (image server) of the image server 107 stored beforehand in the private key memory 90 (step S7). The file header recording unit 89 records the MAC2 in the image file header in a format as shown in (D) of FIG. 9 (step S8). In the case where the information for identifying the camera is left intact, a format as shown in (E) of FIG. 9 is involved. The image file to which the MAC2 is added is sent to the filing management unit 72, after which the image file is stored in the removable recording medium 70 under the control of the storage medium control unit 71 or sent to and stored in an external unit 93 through a communication line 77 under the control of the communication control unit 78.

According to the fifth embodiment described above, the use of the image server makes it possible to check what process is carried out from the original image file and whether the image contents have been changed or not in other than the image server. No alteration is regarded, therefore, even when the process such as data compression or the area cutout is conducted as required from the characteristic of the image data. Also, when the alteration detection data to be added to the image file is generated after editing in the image server, the data for user authentication can also be used to identify the user who has edited the image.

Now, a sixth embodiment of the present invention will be explained. The sixth embodiment is configured with the software for initiating the image server on a PC or the like in the fifth embodiment. For simplicity's sake, a minimum required configuration of the image server is assumed.

Figure 10:
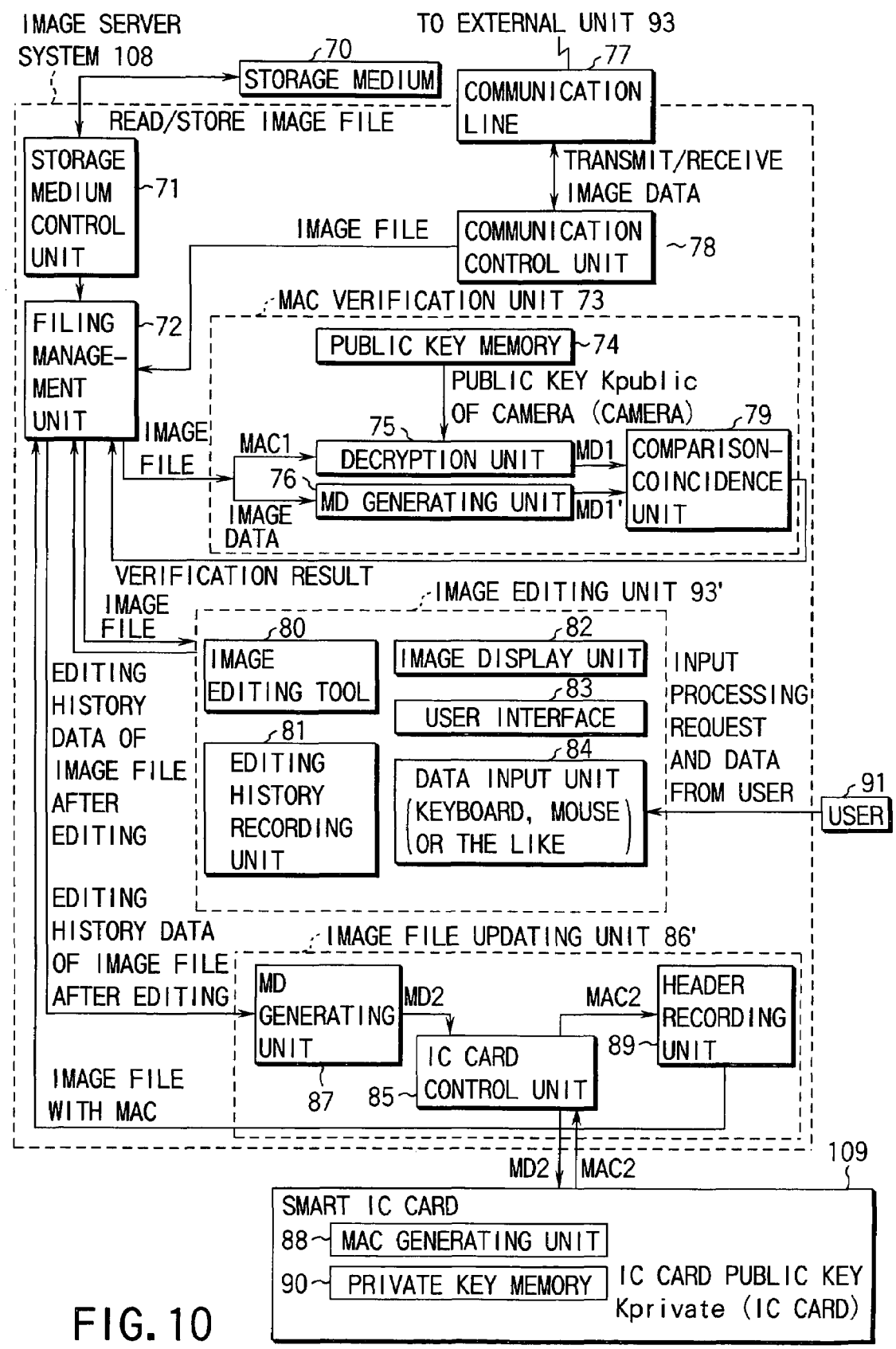
FIG. 10 is a diagram showing a configuration of an image server system according to a sixth embodiment of the present invention.

FIG. 10 is a diagram showing a configuration of the image server system 108 with the image server installed in a PC.

Explanation will be given here only the points different from the configuration of the fifth embodiment shown in FIG. 8.

According to the sixth embodiment, as shown in FIG. 10, the MAC generating unit 88 and the private key memory 90 storing the private key $K_{private}$ are arranged not in the image server system 108 but in the smart IC card 109 removable from the image server 108. Also, the IC card control unit 85 is arranged in an image file updating unit 86' of the image server system 108.

The image file after editing and the editing history data are input to the MD generating unit 87 of the image file updating unit 86', and the MD2 is generated using a predetermined message digest algorithm. This MD2 is sent to the MAC generating unit 88 of the smart IC card 109 under the control of the IC card control unit 85. The MAC generating unit 88 generates MAC2 by encrypting the MD2 using the private key $K_{private}$ (IC card). This MAC2 is sent to the file header recording unit 89 under the control of the IC card control unit 85, and recorded in the image file header in a format as shown in (D) of FIG. 9 or (E) of 9. By the way, as in the fifth embodiment, the user ID code can be stored in the smart IC card 109 and may be read out and recorded in the editing history.

According to the sixth embodiment described above, in addition to the effects of the fifth embodiment, the management of the encryption key and the encryption processing means are configured of a replaceable storage medium such as a smart IC card and other functions such as the image edition and generation of the editing history data are configured of software. Therefore, an image server can be constructed at low cost.

Figure 13:
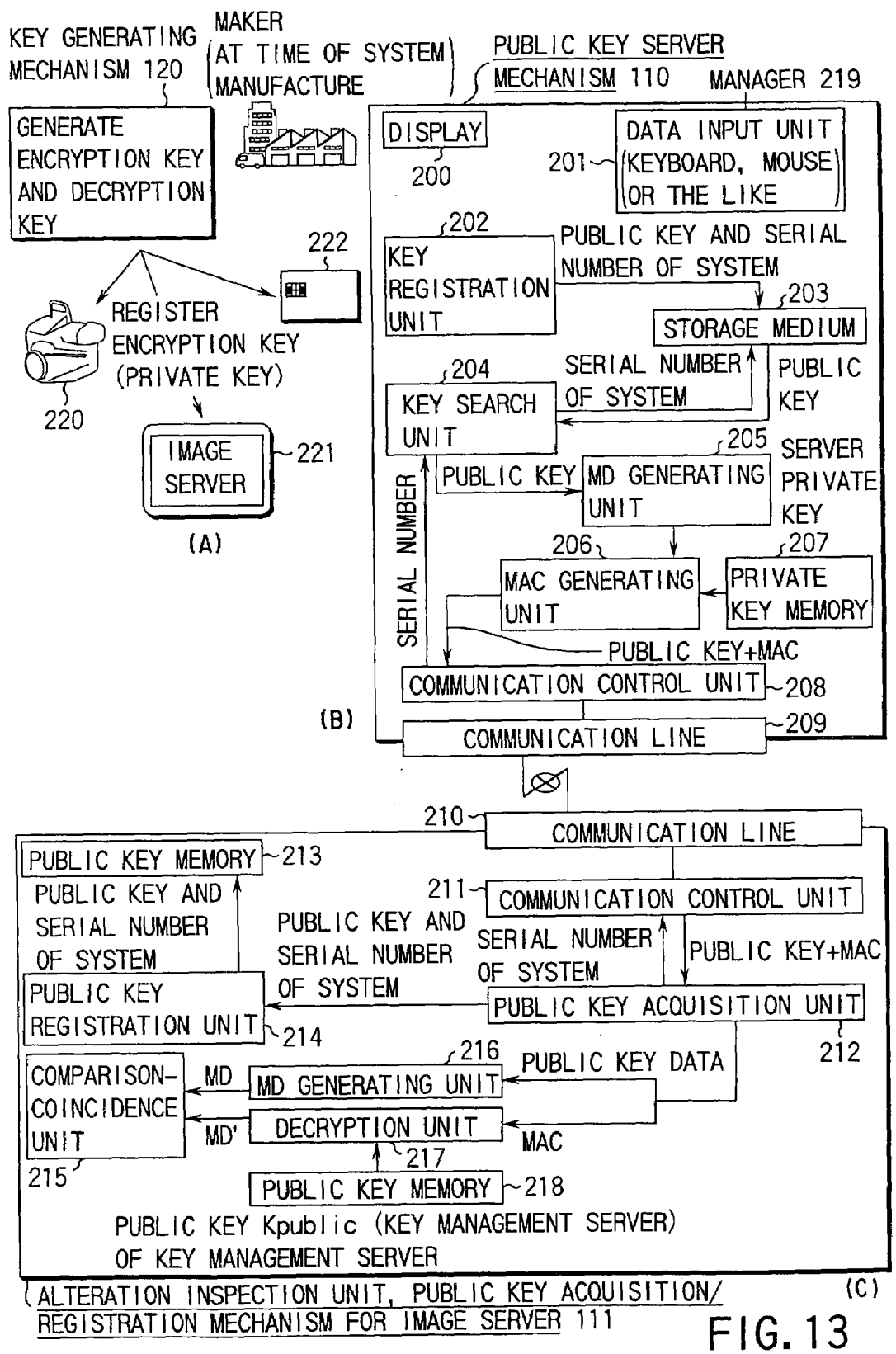
FIG. 13 is a diagram showing a configuration of a decryption key acquisition/registration system according to a seventh embodiment of the present invention.

A seventh embodiment of the present invention will be explained below. The seventh embodiment relates to a decryption key acquisition/registration system, and comprises a public key server mechanism, an alteration inspection device and a public key acquisition/registration mechanism for the image server. The private key as an encryption key and the public key as a decryption key used in the embodiment, as shown in (A) of FIG. 13, is generated by a key generating mechanism 120 when the maker, manufactures the apparatuses such as the digital camera 220, the image server 221 and the smart IC card 222. Of the keys thus manufactured, the private key is built in the apparatus and registered. After registration to the apparatus, this private key is immediately erased from the apparatus using a safe, positive method.

Also, the public key is stored in the recording medium 203 by the key registration unit 202 of the public key server mechanism 110 shown in (B) of FIG. 13 as a key corresponding to the serial number providing a unique identifier to the system.

Figure 12:
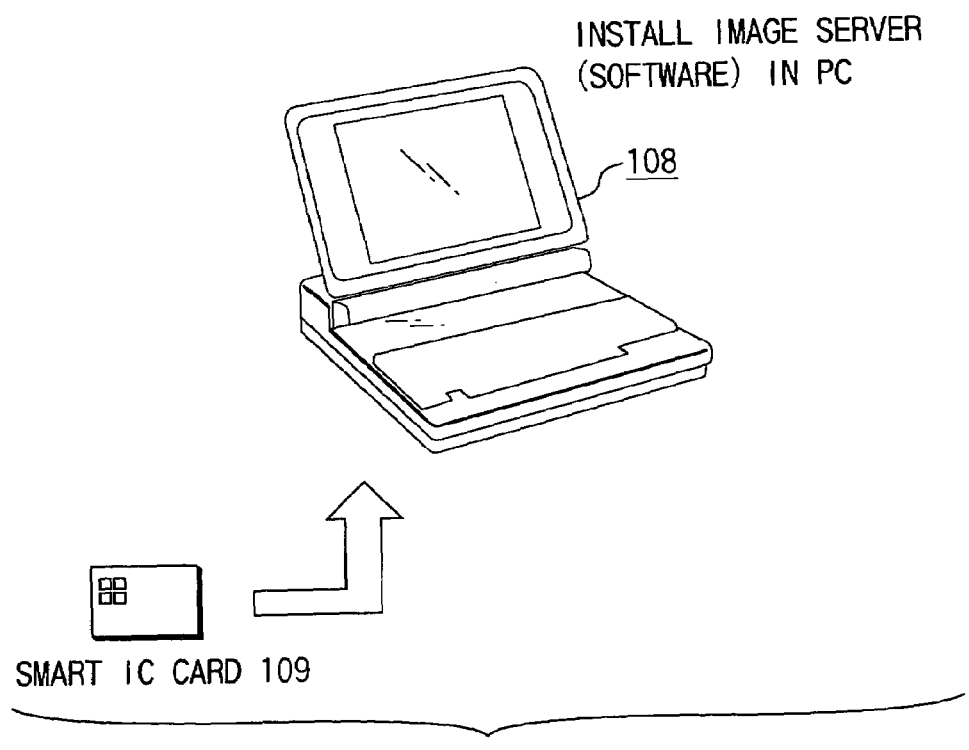
FIG. 12 is a diagram showing an example of the configuration of the image server system according to the sixth embodiment.

The smart IC card 109 of FIG. 12, and the smart IC card 222 of FIG. 13 both are explained as the contact type in which the terminals are exposed on the surface of the card. However, a contactless smart IC card in which the terminals are not exposed on the surface of the card can also be used.

Assume that the alteration detection unit and the public key acquisition/registration mechanism 111 for the image server shown in (C) of FIG. 13 are used to detect an alteration of an image photographed by the digital camera 220, for example. The serial number of the system from the public key acquisition unit 212 is transmitted to a key search unit 204 through the communication control unit 211, the communication lines 210, 209 and the communication control unit 208. The key search unit 204 reads the public key corresponding to the serial number of the system out of the storage medium 203 and sends it to the MD generating unit 205. The MD generating unit 205 generates a MD using a predetermined message digest algorithm and sends it to the MAC generating unit 206. The MAC generating unit 206 generates a MAC using the private key stored beforehand in the private key memory 207, and sends it, together with the public key, to the public key acquisition unit 212 through the communication control unit 208, the communication line 209, the communication line 210 and the communication control unit 211. The public key acquisition unit 212 sends the public key thus acquired and the serial number of the system to the public key registration unit 214. The public key registration unit 214 registers the public key and the serial number of the system in the public key memory 213.

At the same time, the data of the public key from the public key acquisition unit 212 is sent to the MD generating unit 216, and the MAC is sent to the decryption unit 217. The MD generating unit 216 generates a MD from the public key data using a predetermined message digest algorithm. The decryption unit 217 generates MD' by decrypting the MAC using the public key $K_{public}$ (key management server) of the key management server stored in the public key memory 218. The comparison-coincidence unit 215 compares MD and MD' with each other and detects an alteration according to whether the two are coincident or not. The verification of the MAC conducted in this case is intended to check whether the public key of the camera or the image server obtained by the communication means is acquired from a justifiable key management server or further to check whether the public key is not altered during the communication.

The public key registered in the public key server 110 may be delivered to the user by safe means such as the mail service.

According to the seventh embodiment described above, the decryption key of the alteration detection data can be acquired by sending the serial number of the system to the decryption key (public key) server. As a result, in the case where the decryption key server can be used from the internet, for example, the alteration detection data can be acquired from anywhere in the world based on the serial number of the camera.

An eighth embodiment of the present invention will be explained below. The eighth embodiment relates to the prevention of alteration of a multiple resolution image. In the case where a document file is partially changed, for example, the sentences may fail to connect to each other or the meaning may change so that the contents may become different from those of the original file. On the other hand, the image data is high in redundancy. Even when the resolution is changed or the image data is edited to some degree, the photographed object can be recognized in many cases. The image user may have a desire for decreasing the resolution of the image having a size larger than required at the time of photographing or may have a desire for cutting out only the necessary portion because the image includes the unnecessary portions. For this purpose, however, an alteration prevention image server is normally required, within which the image is edited and MAC is added again thereto.

According to the eighth embodiment, in order to solve this problem, the image of the alteration prevention camera is stored in a format holding a multiple resolution image.

Figure 14:
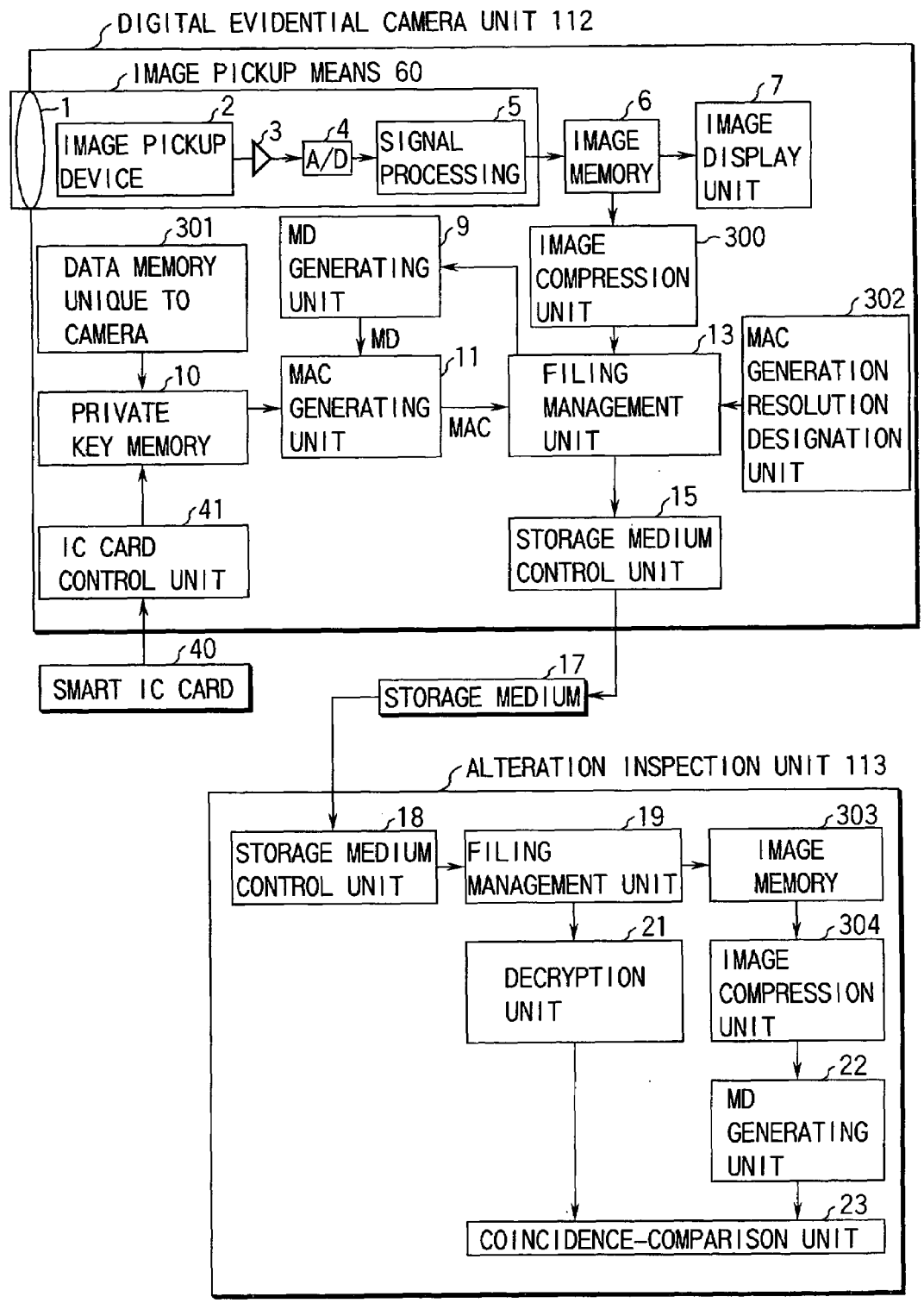
FIG. 14 is a diagram showing a configuration of a digital evidential camera system according to an eighth embodiment of the present invention.

FIG. 14 is a diagram showing a configuration of the eighth embodiment of the present invention. In a digital evidential camera unit 112, the image data obtained by the image pickup means 60 picking up the image of the object is stored in the image memory 6. Then, this image data is input to an image compression unit 300, where it is converted into images of several resolutions. In the process, the user designates a minimum resolution to be guaranteed for the alteration prevention through a MAC generated resolution designation unit 302. This is sent to the MD generating unit 9 through the filing management unit 13. The MD generating unit 9 generates a MD using a predetermined message digest algorithm.

The private key memory 10, on the other hand, includes therein a private key generated from the data unique to the camera stored in the data memory 301 unique to the camera and the information for user authentication read from the smart IC card for user authentication 40 under the control of the IC card control unit 41. The MAC generating unit 11 encrypts the MD generated in the MD generating unit 9 using this private key and sends it to the filing management unit 13. The filing management unit 13 collects the image data of several resolutions into a single file, and further adds the MAC generated from the data of a designated resolution described above to the image data. The resulting data is stored in the storage medium 17 under the control of the storage medium control unit 15.

Figure 16:
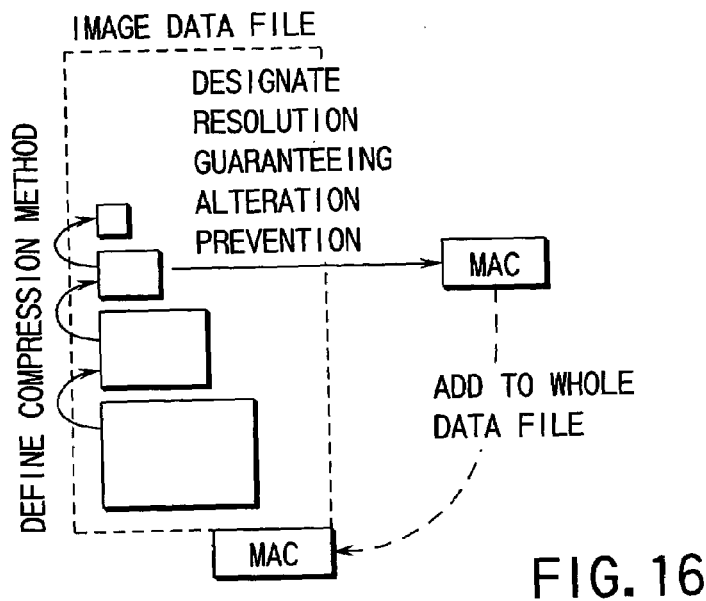
FIG. 16 is a diagram for explaining an image data file according to the eighth embodiment.

FIG. 16 is a diagram for explaining the image data file according to this embodiment. As shown in FIG. 16, the conversion from high to low resolution is defined in advance. The MAC is generated from the data on the resolution guaranteed for the alteration prevention designated by the MAC generated resolution designation unit 302, and recorded in the file header of the image data file or another MAC management file.

In the alteration inspection unit 113, on the other hand, the MAC and the image data are read from the storage medium 17 under the control of the storage medium control unit 18 and sent to the filing management unit 19. In the filing management unit 9, the MAC is sent to the decryption unit 21 and the image data to the image memory 303. The decryption unit 21 generates MD1 by decrypting the MAC using the public key. Also, the image data stored in the image memory 303 is compressed by a predetermined compression method in an image compression unit 304, and then sent to the MD generating unit 22 for generating MD2 using a predetermined message digest algorithm. The coincidence-comparison unit 23 compares MD1 and MD2 with each other and determines whether the image data is altered or not.

Figure 15:
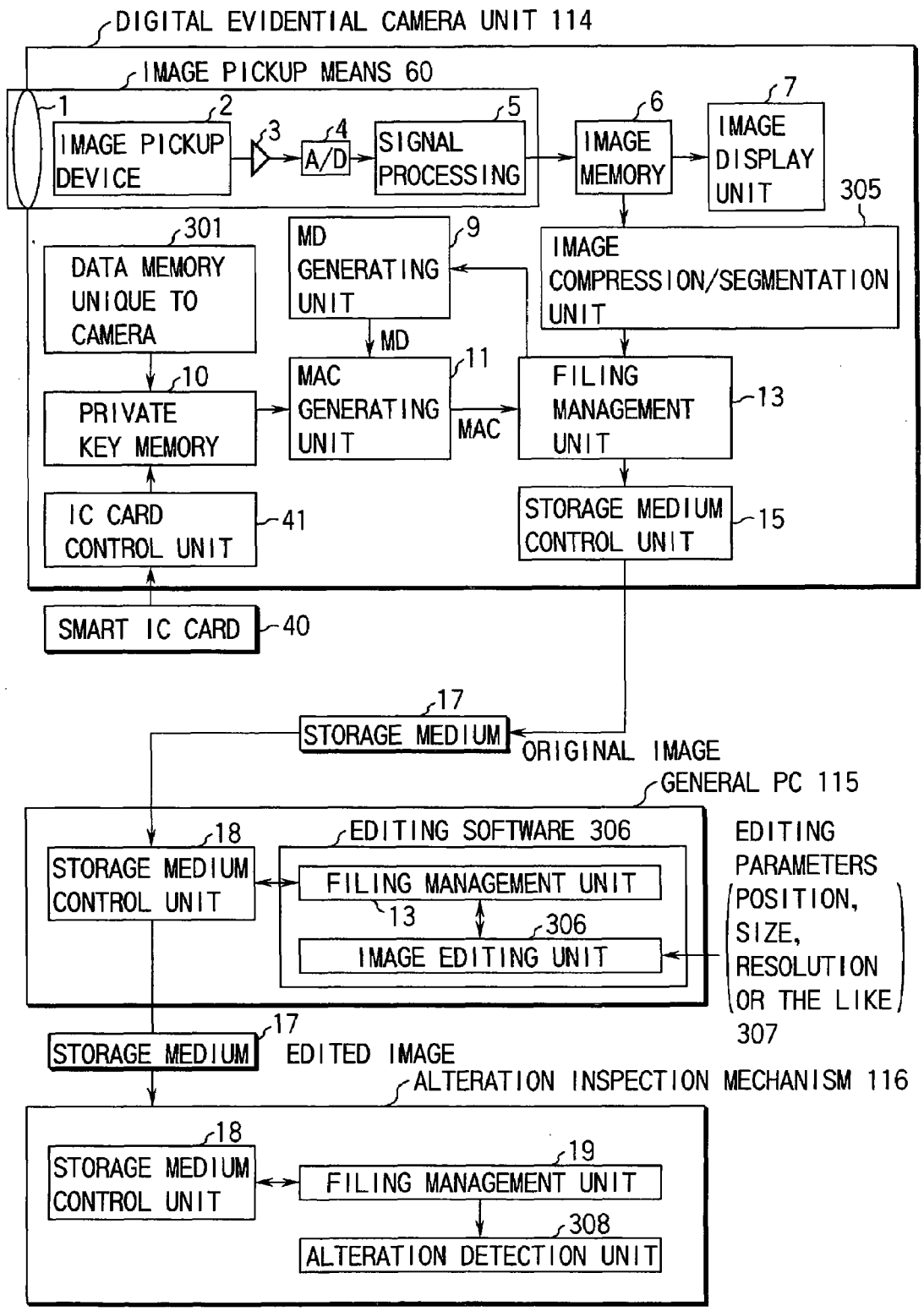
FIG. 15 is a diagram showing a configuration of a digital evidential camera system according to a ninth embodiment of the present invention.

A ninth embodiment of the present invention will be explained below with reference to FIG. 15. The ninth embodiment is intended to hold the image of multiple resolutions while at the same time preventing the alteration of the image format of each resolution stored in units of a small block. The reason why the image format is stored in units of a small block is to permit a part of the image to be referenced with rapidity.

Figure 17:
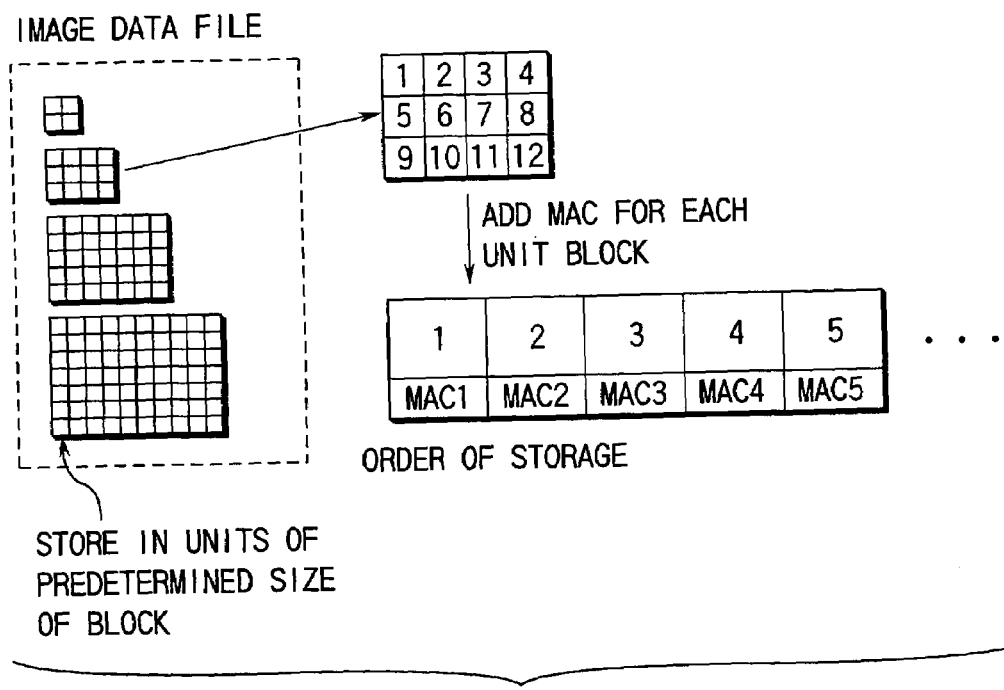
FIG. 17 is a diagram for explaining an image data file according to the ninth embodiment.

The operation of the digital evidential camera 114 is identical to that of the digital evidential camera 112 described above. This embodiment, however, comprises an image compression/segmentation unit 305 for generating images of a plurality of resolutions while at the same time segmenting the image into blocks of predetermined sizes as shown in FIG. 17. The filing management unit 13 generates the MAC for each small block, and writes the MAC in the header for each small block. The image file with the MAC is stored as an original image in the storage medium 17 under the control of the recording medium control unit 15.

At the time of editing, if a user does not want a whole picture image or a high resolution, the user cuts out the required portion or generates an image of the required resolution from the original image read from the storage medium 17 using the editing software 306 in an ordinary PC 115. The user inputs the position, size and the resolution of the required image portion into the image editing unit 306 as editing parameters 207. The filing management unit 13 extracts the image block at a corresponding position from the image of a corresponding resolution and stores it in another image file.

The alteration detection unit 116, when inspecting for alteration, reads out the edited image into the filing management unit 19 from the storage medium 17 under the control of the storage medium control unit 18. The alteration detection unit 308 detects an alteration of the edited image. In the process, if the MAC that has been added for each small block is added to a new file as it is, the user can conduct the editing work such as cutting out an image area or changing the resolution while maintaining the admissibility of the image without an alteration prevention image server. When conducting such filtering processes as contrast emphasis or smoothing, the pixel value itself is not changed but the data having recorded therein the steps of the filtering process are added. Then, the same guarantee as that for the original image is possible for the filter-processed image.

According to this present invention, a digital evidential camera system and a decryption key acquisition/registration system can be provided in which the admissibility of the digital image can be improved and the encryption key can be managed at very high security level. Further, a digital image editing system can be provided, in which the admissibility of the digital image is maintained even after such editing work as compression, cutting out an area of an image or insertion of a caption required due to the characteristics of the image.

The embodiments described above include the invention of the following configurations:

1. A digital evidential camera system for detecting an alteration of image data obtained by photographing an object, characterized by comprising:

a camera including an image pickup unit for picking up an image of an object, and an encryption processing unit for generating an alteration detection data using a built-in encryption key from the image data picked up; and an alteration detection unit for decrypting the alteration detection data generated by the encryption processing unit using a decryption key corresponding to the encryption key and detecting whether the image data has been altered based on the result of the decryption.

(Operation and Effects)

According to this invention, the alteration detection data is generated from the image data using the encryption key in the camera, and this alteration detection data is decrypted using a decryption key corresponding to the encryption key. In this way, the image data can be checked as to whether it has been altered or not. Thus, the admissibility of the digital image which has hitherto been considered inferior to that of the image photographed by a camera using a conventional film can be improved.

Also, the encryption key for generating the alteration detection data must never leak outside to any one including the camera user. According to this invention, the encryption key for generating the alteration detection data is stored in the camera beforehand. Therefore, the encryption key can be managed at a very high security level in terms of hardware.

2. A digital evidential camera system as described in configuration 1, characterized in that the encryption processing unit encrypts the data obtained by application of a predetermined function for the image data, using the encryption key, thereby generating the alteration detection data.

(Operation and Effects)

In order to assure a considerable change even with a slight alteration of the image data, the data obtained by application of a predetermined function (such as the hash function) is encrypted to generate the alteration detection data. Therefore, an alteration detection data can be provided by which an alteration can be detected more accurately.

3. A digital evidential camera system as described in configuration 2, characterized in that the alteration detection unit compares the data obtained by application of the predetermined function to the image data with the data obtained by decrypting the alteration detection data using the decryption key thereby to detect whether the image data has been altered or not.

(Operation and Effects)

Since the alteration detection data is used, an alteration can be detected more accurately.

4. A digital evidential camera system as described in configuration 1, characterized in that the encryption processing unit generates the alteration detection data based on the encryption key, the image data, and the data for identifying a photographer.

(Operation and Effects)

At the time of generating, the alteration detection data for the image data, the information for identifying the photographer is added. Thus, the photographer can be identified as well as whether an alteration has occurred or not.

5. A digital evidential camera system as described in configuration 4, characterized in that the encryption processing unit generates a first alteration detection data from the image data using the encryption key, generates a second alteration detection data from the image data using data for user authentication and combines the first and second alteration detection data into the alteration detection data.

(Operation and Effects)

The first alteration detection data generated using the encryption key is combined with the second alteration detection data generated from the image data using the data for user authentication. Therefore, an application of the second alteration detection data is made possible in a same way that the digital signature is used in other information systems such as electronic mail or electronic commercial transactions. Thus, a digital evidential camera system can be constructed which can cooperate with the information systems constituting an infrastructure such as electronic notaries and electronic commercial transactions.

6. A digital evidential camera system as described in configuration 4, characterized by comprising a storage unit for storing the data for identifying the photographer and the encryption key and a second encryption processing unit for generating the second alteration detection data from the data for identifying the photographer, wherein the second encryption processing unit is removably mounted on the camera.

(Operation and Effects)

The data for identifying the photographer and the encryption key are stored, and second encryption processing unit for generating the second alteration detection data is provided on a medium (IC card or the like) removable from the camera. Therefore, a photographer carrying this medium, even when using a camera owned by others, therefore, can be authenticated and a photographed image can be checked for alteration accurately.

7. A digital evidential camera system as described in configuration 4, characterized in that the encryption processing unit generates the alteration detection data using the encryption key from the combination of the image data and the data for identifying the photographer.

(Operation and Effects)

In a method for generating the alteration detection data using the encryption key from a combination of the image data and the information for identifying the photographer, the alteration of the image data and the alteration of the information for identifying the photographer can be detected with a single alteration detection data. If the information for identifying the photographer is not altered, the photographer can be identified from the information for identifying the photographer.

8. A digital evidential camera system for detecting the alteration of the image data obtained by photographing an object, characterized by comprising:

a camera including an image pickup unit for picking up an image of the object, and an encryption processing unit for generating the alteration detection data using a built-in encryption key from the image data obtained by image pickup; and an alteration detection unit for decrypting the alteration detection data generated in the encryption processing unit using the decryption key corresponding to the encryption key and detecting whether the image data has been altered based on the result of decryption;

wherein the camera, in addition to the alteration monitor mode for detecting whether the image data has been altered, has a secure mode for encrypting the image data transferred from the camera to the alteration detection unit, a digital watermark mode for embedding a digital watermark in the image data and a normal mode for taking a photograph without the security function, the system further comprising a mode selection unit for selecting at least the desired one of the modes.

(Operation and Effects)

The camera is provided with the function of selecting various modes. In this way, the desired function can be set in accordance with the object for which the camera is used. When photographing a snap image, for example, the normal mode is used. In the case where an image of an object constituting an evidential image is photographed, the alteration monitor mode is used. Also, for an image which requires the copyright protection, the digital watermark mode is used. Further, when photographing a highly confidential image and desiring to transmit the image file safely, the secure mode is selected to assure safe storage and transmission of data. Also, by combining a plurality of the modes, the effects described above can be obtained by a single camera used for various applications.

9. A decryption key acquisition/registration system characterized by comprising:
 a decryption key server including a decryption key storage unit for storing a unique identifier to the system and a first decryption key corresponding to a first encryption key generated as a key corresponding to the identifier, and a decryption key output unit for generating the alteration detection data for the first decryption key using the second encryption key and outputting the alteration detection data together with the first decryption key; and
 a decryption key acquisition unit including a decryption key storage unit for storing the first decryption key acquired from the decryption key server through communication means or the like, and an alteration detection unit for decrypting the alteration detection data supplied from the decryption key server through communication means or the like, using a second decryption key corresponding to the second encryption key, and detecting whether the first decryption key has been altered or not based on the result of the decryption.

(Operation and Effects)

According to this invention, the decryption key for the alteration detection data can be acquired by sending the serial number of the system to the decryption key server. In the case where the decryption key server can be used from the internet, for example, the alteration detection data can be acquired from anywhere in the world based on the serial number of the camera.

10. A digital image editing system for detecting the alteration of image data and editing the image data, comprising:
 a filing management unit for managing the file of the image data input thereto through an image input unit;
 an alteration detection unit for decrypting a first alteration detection data attached to the image data by use of a decryption key corresponding to an encryption key used for generating the alteration detection data, and comparing the first alteration detection data thus decrypted with the image data thereby to detect the alteration of the image data;
 an image editing unit for processing the image data using various functions; and
 an image file updating unit for generating a second alteration detection data using an encryption key other than the first encryption key from the edited image data processed by the image editing unit and the editing history data output by the image editing unit, and adding the second alteration detection data to the edited image data.

(Operation and Effects)

According to this invention, the alteration detection data is generated by combining the image data with the editing history. It is possible therefore to check the manner in which the original image is edited. Further, it is possible to detect whether the image editing process is performed in other than the system.

11. A digital image editing system as described in configuration 10, characterized in that the image file updating unit is removable from the digital image editing system, has stored therein the information for user authentication and the second encryption key, and generates the second alteration detection data using the second encryption key and the information for user authentication.

(Operation and Effects)

The management of the encryption key and the process of encryption can be accomplished by a removable storage medium such as a smart IC card, and the other functions such as the editing of the image and the generation of the editing history data are configured of software. Thus, an image server can be constructed with a low cost.

12. A digital image editing system as described in configuration 9, characterized in that the editing history is recorded in combination with the information for editor authentication.

(Operation and Effects)

A photographer can be identified by including the information on a person who edited the image data in the image data containing the image editing history data.

13. A digital image editing system as described in configuration 9, characterized in that the image input unit inputs the image data stored in an external storage medium by connecting directly to the image filing unit (cable, IrDA) or through a communication line.

(Operation and Effects)

The image filing unit of the image server is provided with a terminal for direct connection of the serial cable, SCSI, IrDA or the like and a terminal for connecting to a network such as Ethernet or the like. In this way, the image file can be easily input from an external unit.

14. A digital evidential camera system as described in configuration 1 or 10, characterized in that the image data is multiple resolution image data including a plurality of image data of different resolutions combined and stored, and the encryption processing unit includes a selection unit for selecting at least one image data having a desired resolution from the multiple resolution image data in order to generate the alteration detection data.

(Operation and Effects)

At the time of recording, a resolution for guaranteeing the alteration detection is defined. In this way, the image user can use the desired resolution image without resorting to the resolution at the time of photographing.

15. A digital evidential camera system as described in configuration 1 or 10, characterized in that the image data is multiple resolution image data including a plurality of image data of different resolutions combined and stored,
 each one of the multiple resolution image data is stored in units of a predetermined small block, and
 the encryption processing unit generates the alteration detection data in units of the small block.

(Operation and Effects)

The alteration detection data are added for each small block. Thus, the alteration of an edited image such as a cutout image can also be detected without an exclusive server.

What is claimed is:

1. A digital image editing system for detecting an alteration of image data and editing the image data, comprising:
   a filing management unit for filing and managing the image data input thereto through an image input unit;
   an alteration detection unit for decrypting first alteration detection data attached to the image data by use of a decryption key corresponding to a first encryption key used for generating the alteration detection data, and for comparing the first alteration detection data thus decrypted with the image data thereby to detect the alteration of the image data;
   an image editing unit for processing the image data; and
   an image file updating unit for generating second alteration detection data using a second encryption key other than the first encryption key from the image data processed by the image editing unit and editing history data output by the image editing unit, and for adding the second alteration detection data to the edited image data;
   means for adding and storing editor authentication data read from a detachable IC card;
   wherein the image file updating unit is removably mounted on the digital image editing system, and has stored therein the editor authentication data and the second encryption key; and
   wherein the second alteration detection data is generated using the second encryption key and the editor authentication data.

2. A digital image editing system according to claim 1,
   wherein the image data comprises multiple resolution image data including a plurality of image data of different resolutions combined and stored in different sets; and
   wherein the encryption processing unit includes a selection unit for selecting at least an image data having a desired resolution from the multiple resolution image data in order to generate the alteration detection data.

3. A digital image editing system according to claim 1,
   wherein the image data comprises multiple resolution image data including a plurality of image data of different resolutions combined and stored in different sets;
   wherein each of the multiple resolution image data is stored in units of a predetermined stall block; and
   wherein the encryption processing unit generates the alteration detection data in units of the small block.

4. A digital image editing system according to claim 1,
   wherein at least a part of the image file updating unit is removably mounted on the digital image editing system, and has stored therein editor information and the second encryption key, and
   wherein the second alteration detection data is generated using the second encryption key based on the image data, and data obtained by applying a predetermined function from the editing history data output by the image editing unit.

* * * * *